Figure 1:
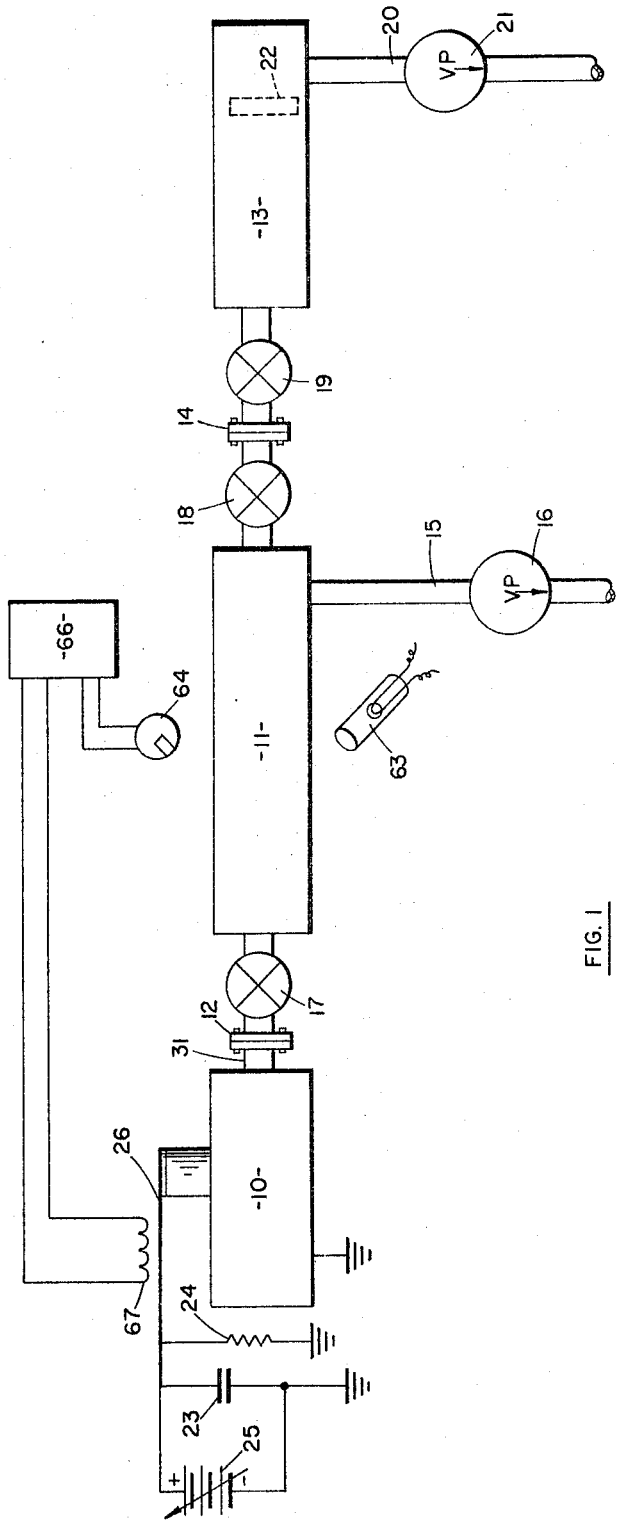

Aug. 23, 1966  E. A. ESCALLIER ET AL  3,267,720
ACCELERATOR

Filed May 27, 1963  3 Sheets-Sheet 1

INVENTORS
EDWARD A. ESCALLIER
BY CHARLES N. SCULLY

ATTORNEY

Aug. 23, 1966  E. A. ESCALLIER ET AL  3,267,720
ACCELERATOR
Filed May 27, 1963
3 Sheets-Sheet 2

INVENTORS
EDWARD A. ESCALLIER
BY CHARLES N. SCULLY

ATTORNEY

United States Patent Office 3,267,720
Patented August 23, 1966

3,267,720
ACCELERATOR
Edward A. Escallier, Norwalk, and Charles N. Scully, Whittier, Calif., assignors to North American Aviation, Inc.
Filed May 27, 1963, Ser. No. 283,202
14 Claims. (Cl. 73—12)

This invention relates to accelerating material to high velocity. In particular it relates to apparatus and methods for study, observation, investigation and measurement of high velocity phenomena.

In the operation of artifical satellites, space probes and other vehicles outside of the protective atmosphere of the earth, there is a danger of impact damage due to collision with micrometeorites. These are small particles of matter traveling at high velocity in the space beyond the earth's atmosphere. The number of particles that may be present in any region and their mass, velocity and composition are not always accurately known. Space probes have been made to investigate the number of micrometeorites near the earth and to give some indication of their mass and velocity. Because of the relative velocity of vehicles traveling through space the velocity of the individual projectiles impacting on a surface will be within a very broad range. Generally speaking the relative velocity of impact with the majority of micrometeorites will be less than 50,000 feet per second. The great bulk of the micrometeorites encountered have diameters as indicated by their mass which will not exceed approximately 100 microns. Most of the micrometeorites will be composed of stony silicate materials similar to the stony meteorites collected on the surface of the earth.

In order to calibrate instruments for the measurement of data on naturally occurring micrometeorites, it is desirable to have a laboratory instrument for accelerating similar particles to the necessary velocities. Such an instrument also allows studies of the damage effects produced by such particles on various materials. Previously available accelerators have involved the use of explosive techniques to push against the base of a projectile to accelerate it to high velocities. Both electrical and chemical explosive techniques have been employed. The principal difficulty with the previously available accelerators has been the loss of geometrical integrity of the projectiles. Special photographic techniques must be resorted to in order to estimate the surviving mass of the projectile after acceleration to correlate the impact damage observed with mass and velocity. The uncertainty of mass and velocity restricts the predictability of the testing conducted.

In addition to a need for a particle projector, many problems require a high velocity gas flow wherein the gas is simple in composition and of low denesity. Thus, for example, it may be desired to study the interaction of flowing gas with solid surfaces or the drag coefficients of various solid bodies or the phenomena associated with shock waves. High gas flows have been obtained in systems wherein a pressure confining disk is ruptured or in systems employing hydromagnetic acceleration. Either of such systems is relatively expensive to construct and operate and is limited to acceleration of those materials normally gaseous.

Accordingly, it is a broad object of this invention to accelerate material to high velocities.

The hypervelocity accelerator described in an exemplary embodiment is a vacuum instrument having a target chamber containing a target upon which projectiles impact, a flight range in which physical measurements can be made and a gun chamber for accelerating the particles. In the gun chamber a high density, very high temperature gas is generated in a confined space by the discharge of a large capacitor through a confined elongated lithium body, such as a cylinder. The resultant metal vapor flows from the region of confinement through a tubular connection coaxially aligned with the cylinder to the evacuated flight range. A coaxial arrangement of exploding cylinder, electrodes and expansion path provides a system with a low inductance for greatest energy utilization.

Projectiles to be accelerated are contained in the tubular connection and are accelerated to a considerable fraction of the gas velocity by means of aerodynamic drag. This technique of acceleration quickly brings the projectiles to a very high velocity without subjecting them to extreme impact loading nor the disturbing effects of an arc plasma or chemical flame. By suspending the particles in the tubular connection out of contact with the walls, it is possible to avoid erosion of the particles in their travel through the tubular connection. Thus the particles can be accelerated to a high velocity without destroying their structural integrity. Intact spheres of borosilicate glass 45 microns in diameter have been accelerated to 50,000 feet per second with described apparatus.

In the study of high velocity impact upon surfaces a phenomenon is observed above a critical velocity dependent on the materials involved, which phenomenon is termed a hypervelocity phenomenon, and velocities above the critical velocity that produces the effect are known as hypervelocities. he phenomenon is one of impact of a solid on a semi-infinite block of material and is characteristic of the combination of projectile and target materials. The unique effect is the appearance of a substantially smooth impact crater with no trace of the projectile left in the crater. The critical velocity is not necessarily related to the speed of sound in the medium. Thus, for example, in the impact of lead projectiles on a lead block anything above about 2,000 feet per second is termed hypervelocity and for aluminum impacting on aluminum the hypervelocity impact phenomenon first occurs at about 16,000 feet per second.

Thus it is a broad object of this invention to accelerate material to very high velocities.

It is another object of this invention to provide a means for impacting a target with projectiles traveling at very high velocities.

It is a further object of this invention to provide a high velocity fluid.

It is another object of this invention to provide a method for imparting high velocity to projectiles without destruction of their structural integrity.

Figure 2:
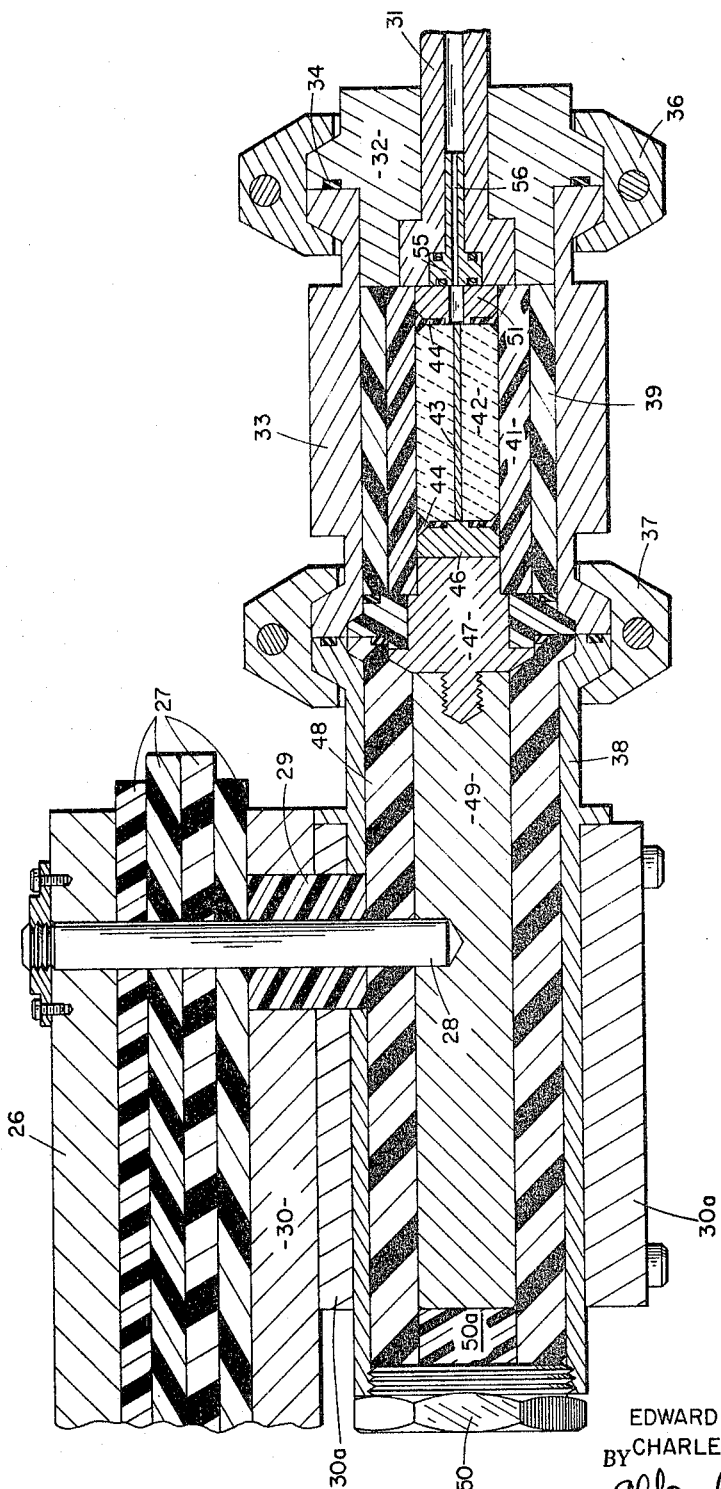
Figure 3:
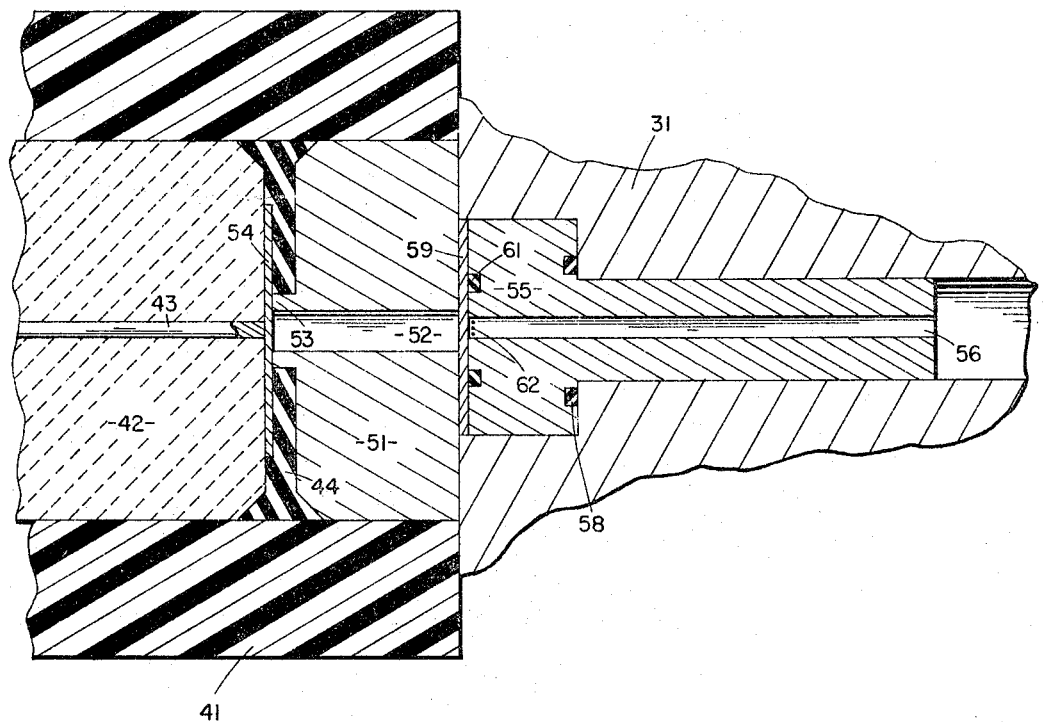

Other objects and many attendant advantages of this invention become apparent by examination of the following description and drawings wherein:

FIG. 1 illustrates schematically a hypervelocity accelerating and measuring system constructed according to the principles of this invention, FIG. 2 is a cross section of the accelerating portion of the hypervelocity system of FIG. 1, and FIG. 3 is a detailed view of a part of the accelerating portion including a gun chamber and projectile support.

Throughout the drawings like reference numbers refer to like parts.

As illustrated in FIG. 1 there is provided a hypervelocity accelerator or hypervelocity gun system embodying principles of this invention which comprises a high voltage direct current power supply and a large energy storage capacitor bank, a massive lithium wire connected to carry the entire current in a circuit including the capacitors, which current is large enough to explode the lithium wire upon discharge of the capacitors, an arc chamber containing the lithium wire and contained in an insulating intermediate liner and an outer chamber wall to contain the high pressures involved. In addition the gun system comprises connecting tubes between the arc chamber and a flight range which is preferably a glass chamber evacuated to approximately one micron of mercury total pressure, a system for measuring the velocity of the accelerated particles and checking their geometrical integrity, a target holder and target and associated pumps, gauges, instruments and cameras.

The arc chamber is in the form of an axial cylindrical passage in an insulating cylinder. The chamber is initially substantially completely filled with the lithium wire. A flat electrode makes electrical contact with one end of the lithium wire in the arc chamber, and a second electrode having an axial passage is provided at the opposite end of the lithium wire. Electrical breakdown of an insulating film between the lithium wire and the latter electrode at high voltage serves to complete an electrical circuit including electric storage capacitors and allows a heavy current to flow through the lithium wire thereby exploding the lithium wire. The expanding lithium vapor after explosion of the wire expands through the axial passage in the electrode, vaporizes a disk upon which one or more projectiles are suspended and further expands along a tubular connection or "gun barrel" which is connected to the balance of the flight range. Aerodynamic drag by the expanding lithium vapor accelerates the projectiles to a velocity which is a substantial fraction of the velocity of the lithium vapor.

FIG. 1 illustrates somewhat schematically the hypervelocity accelerating and measuring system. This system includes a gun chamber 10 connected to a glass flight range 11 by a conventional vacuum connector 12. The flight range is in turn connected at its opposite end with a target chamber 13 by a second vacuum connection 14. A conduit 15 is provided on the flight range for connection to a vacuum pump 16 for evacuation of the flight range to a pressure of about one micron of mercury. A conventional vacuum valve 17 separates the flight range from the gun chamber and a second vacuum valve 18 separates the flight range from the vacuum connection 14. In this manner the flight range can be pressure isolated when the vacuum connections 12 and 14 are open and evacuation can be continued to minimize the time required to operate the system.

A vacuum valve 19 is interposed between the target chamber 13 and the vacuum connection 14 which leads to the flight range. This allows isolation of the target chamber when the connector is open. The target chamber then can be evacuated by means of a conduit 20 connected to a vacuum pump 21. When all of the vacuum valves are open, the system is so aligned that a clear and unobstructed straight path is provided between the gun chamber and the target chamber through the vacuum connectors and the valves. The target chamber contains a target holder 22 which can support a target against which projectiles are permitted to impact. These targets (not shown) can include such things as sheets of structural materials being studied for impact damage or impact sensors undergoing calibration. Instrumentation such as microphones to pick up noise generated from the impact and flash photometers for detecting luminous flashes from impacts can also be installed in or around the target chamber for measuring impact phenomena. A great variety of measuring instruments can be used without departing from the scope of this invention, and since these auxiliary instruments are not a part of an accelerating apparatus they are not shown herein.

In order to provide electrical energy to the lithium wire a large capacitor bank schematically illustrated at 23 is electrically connected with the gun chamber 10. This capacitor bank is comprised of conventional low inductance coaxial capacitors operating at voltages up to 30,000 volts. Seven such capacitors with a capacity of 10 microfarads each are used to give a total energy storage of 31,500 joules. The voltage employed in the capacitor bank has been selected at 30,000 volts for convenience. Higher voltages may be convenient in some installations in view of the fact that the energy stored in the capacitor bank increases as the square of the voltage but only as the first power of the capacitance. However, higher voltages yield large corona losses, particularly when the ambient humidity is relatively high. In high humidity environments it may be necessary to operate such a system at voltages as low as 20,000 volts. It is preferred that a maximum of 30,000 volts be used to give a maximum energy storage without disturbing corona discharge or extreme danger of accidental electrical breakdown of insulation. As a matter of practice in the operation of the described equipment the capacitors are usually charged to approximately 25,000 volts before discharge. Operation at this voltage level substantially increases the expected life of the capacitors and provides sufficient energy to accelerate most projectiles to a sufficient velocity.

In order to charge the capacitor bank a variable power supply 25 is provided. This is a conventional direct current power supply with an output that is variable from 0 to 50 milliamperes at a voltage up to 30,000 volts. A variable input to the capacitor bank is required to avoid excessive currents upon initial charging of the bank. High charging rates are desirable to achieve consistently good results and avoid premature firing of the gun system. For the purpose of safety the capacitor bank and power supply are grounded through a resistor 24 which in this embodiment has a resistance of 5 megohms. This resistor permits discharge of the capacitors if a firing is not conducted after a partial charge is accumulated and is provided for the safety of personnel.

The accelerating portion or gun chamber 10 is shown in cross section in FIG. 2 and a portion of this cross section is shown in somewhat greater detail in FIG. 3. In all of these figures like reference numerals refer to like parts. The gun chamber has an electrical connection to the high voltage portion of the capacitor bank 23 by a heavy flat metal plate 26 capable of carrying the heavy currents generated during discharge of the capacitors. The plate is connected to the individual capacitors by heavy metal leads (not shown). A flat metal plate 30 is connected to the low voltage (ground) side of the capacitor bank and is insulated from the high voltage metal connector plate 26 by several flat layers of electrical insulation 27. A rectangular split metal block 30a having an inner circular surface mating with the exterior of the gun chamber housing 38 is bolted to the grounding plate 30 in such a way as to form a clamp surrounding the gun chamber for mechanical support for the gun chamber and to provide electrical contact between the gun chamber housing 38 and ground. The two metal plates 26 and 30 and the intervening layers of insulation are secured together by a number of electrically insulated bolts (not shown). The higher voltage metal connector plate 26 is electrically connected with the interior of the gun chamber by means of a cylindrical metal rod 28 which is insulated from the gun chamber housing and the grounding plate by a nylon sleeve 29. Except for the described electrical connections 26, 28 and 30 and the supporting rectangular block 30a, the balance of the parts of the gun chamber shown in the cross-sectional views of FIGS. 2 and 3 are substantially circularly symmetrical and aligned along a common axis.

The gun chamber is connected to the flight range 11 through a connecting tube 31 which can be vacuum sealed to the flight range by means of a conventional connector 12 (FIG. 1). This portion of the gun chamber is referred to herein as the front portion and the front portion of other components as used herein means the portion more nearly adjacent the end connected to the flight range. The connecting tube 31 as well as most of the other metal parts in the gun chamber are conveniently constructed of steel to provide sufficient strength to resist the high pressures and stresses imposed during operation of the gun. Steel is also conveniently used in some locations where high stresses are not involved since it is economical to obtain and fabricate, and some of the metal parts can be used for only a limited number of firings before they must be discarded. The tubular connection 31 is surrounded and contained by a steel member 32 which is sealed to the outer chamber wall 33 of the gun chamber by a conventional vacuum seal 34. The steel member 32 assists in the containment of instantaneous pressures which are generated during operation of the gun. Conical surfaces are provided on the member 32 and the outer chamber wall 33 so that they can be secured together by a circumscribing clamping ring 36 having two semi-circular halves which are bolted together to provide a secure mechanical connection. A similar clamp 37 secures the outer chamber wall 33 to the rear portion 38 of the gun chamber housing.

The outer chamber wall 33 is constructed with a substantial thickness to resist high pressures which are generated when the lithium wire is exploded as described hereafter. This high pressure is uniformly distributed over the outer chamber wall and is largely contained by an epoxy resin-glass fiber, laminated annular cylinder 39. There is a tight fit between the epoxy resin-glass fiber cylinder and the outer chamber wall. The cylinder 39 is formed by circumferential windings of glass fiber thoroughly coated with an epoxy resin which is subsequently cured to form a structural cylinder with a very high hoop strength. Within the epoxy resin-glass fiber cylinder is a hollow nylon cylinder 41 which is press fitted within the epoxy resin-glass fiber cylinder. This resilient material provides some stress distribution and protects the epoxy resin-glass fiber cylinder so that these relatively expensive items can be used for many firings.

Nylon is a generic term for long chain polymeric amides. Any of the polymers in this class having the characteristics of toughness over a wide range of temperatures, resilience, abrasion resistance, dimensional stability, good dielectric strength and chemical resistance are suitable for use in the hypervelocity gun chamber. Other polymeric materials capable of absorbing energy can be substituted, such as, for example, polyetetrafluoroethylene (Teflon) or polymeric trifluorochloroethylene (Kel-F).

Tightly fitted within the nylon cylinder is a pyrophyllite cylinder 42 which has been heat treated at about 2,000° F. to produce a high hardness. This is a preferred materrial since it is readily fabricated and the cylinders must be replaced after every use of the gun. Other ceramic type materials can be substituted for the pyrophyllite. The pyrophyllite cylinder has an axial hole which is substantially filled with a lithium wire 43 when the gun is ready for firing. The diameter of the hole in the pyrophyllite cylinder and the length of the cylinder are formed to accommodate the dimensions of the lithium wire which are selected to provide suitable operation of the gun as is described hereafter. The pyrophyllite cylinder is preferably about one to three inches long so as to contain a suitable quantity of lithium wire. Washers 44 of a silicone rubber or similar elastomeric material are placed at each end of the pyrophyllite cylinder to give a pressure seal and provide a small amount of cushioning to prevent mechanical damage to the pyrophyllite upon assembly of the gun chamber.

An electrode 46 is centered at the rear end of the pyrophyllite cylinder with a face that is substantially flat and in electrical contact with the lithium metal wire 43. This electrode 46 is also in electrical contact with a metal part 47 which has a tapered shoulder in contact with a nylon cylinder 48. The shoulder distributes some of the setback upon firing of the gun to the nylon cylinder 48 which absorbs a substantial amount of recoil energy. The metal part 47 is threaded into a heavy steel slug 49 which completes the electrical path between the copper rod 28 and the lithium wire 43 and which also has sufficient inertia to minimize thrust loads against the rear part of the gun chamber housing. Closure of the gun chamber housing is provided by a metal plate 50 threaded into the rear part of the housing 38. A nylon plug 50a is between the end plate 50 and the steel slug 49 to absorb some of the recoil energy and protect the end plate 50 from damage upon firing of the gun.

At the front end of the pyrophyllite cylinder and its contained lithium wire is a metal electrode 51 which has an axial passage 52 therethrough. The construction details of this portion of the gun chamber are illustrated in greater detail in FIG. 3. A shoulder 53 around the rear end of the axial passage is proximate to the lithium wire in the pyrophyllite cylinder. A sheet of Mylar 54 with a thickness of 0.001 to 0.0015 inch is interposed between the shoulder 53 on the electrode 51 and the lithium wire to provide a dielectric insulation which has a high dielectric strength as is discussed hereafter. Mylar is a trade name for oriented films of polyethylene terephthalate available from E. I. du Pont de Nemours, Inc., Wilmington, Delaware. Other dielectric materials with good dielectric strength in thin films can be substituted such as other polyesters, polyethylene films, and some nylon films. To provide a somewhat higher dielectric strength or electrical breakdown potential, multiple films of Mylar can be used. The breakdown potential that can be expected can be determined by subjecting the sheets to be used to a voltage nearly as high as the voltage desired. Using sheets that do not break down in this preliminary qualification test virtually eliminates low voltage and hence low velocity misfires. In the operation of the gun, the Mylar film for dielectric breakdown is particularly preferred, however, operation can be with an external switch to initiate current flow. Although such a switch has the advantage of certainty in the time that the gun fires, it suffers from the severe disadvantage that even with the best switches available, considerable energy is dissipated in the switch; energy that is preferably present in the exploding wire. External switches must be of a non-arching high pressure type, but even if large amounts of energy are not lost in an arc in a switch, it is effectively lost due to the high inductance of such switches.

In front of the electrode 51 there is provided a metal gun barrel 55 having an axial passage 56 therethrough which is substantially aligned with the passage through the front electrode and with the lithium wire. This passage is a smooth walled cylindrical shape and is from 1¼ inch to 12 inches long as dictated by the requirements of the experiment being conducted. This length and other parameters in the operation of the gun are discussed further hereafter. A seal 58 is provided between the gun barrel 56 and the housing 31 to permit evacuation of the gun chamber. When it is desired to operate the acceleration system as an accelerator for gases rather than as a particle projector, a convergent-divergent nozzle (not shown) can be used in place of the gun barrel to direct the high velocity flowing gases. Likewise when using the system as a particle projector it is often desirable to use a divergent tube rather than a smooth wall cylinder to obtain better energy transfer to the particles. This divergent tube is useful for relatively short barrel lengths.

A Mylar disk 59 is positioned between the gun barrel 55 and the front electrode 51. This disk is preferably about 0.001 inch thick and may be coated with a very thin layer of petrolatum or low vapor pressure grease on the side facing the gun barrel before installation in the apparatus. A vacuum seal 61 between the gun barrel and the Mylar film and hence the front electrode prevents dissipation of the high pressures encountered during operation of the gun. Projectiles 62 (FIG. 3) to be accelerated in the high velocity system are suspended on the surface of the Mylar film 59 on the side facing the gun barrel and in a position intermediate the walls of the gun barrel. These projectiles may be suspended on the Mylar surface by electrostatic attraction or they may be held to the surface of the film because of the adhesion of the above mentioned grease to the small projectiles.

The disk 59 is preferably made of Mylar because it has reasonably high mechanical strength and completely vaporizes without deleterious chemical reactions. Projectiles of a size often accelerated can be held to the Mylar by electrostatic attraction. It is possible to substitute other sheet materials that will completely vaporize in the high temperature environment such as, for example, polyethylene, other polyesters and the like. A disk of sheet material is preferred for handling purposes, however, open weave or very thin fabrics of suitable materials or single filaments for supporting projectiles can be substituted for the sheet Mylar disk.

In order to operate the hypervelocity gun the above described parts are assembled as indicated. When the gun chamber is completely assembled it is connected to the flight range 11 by means of the vacuum connection 12. The flight range is normally maintained in an evacuated condition and when the valve 17 is opened the small volume in the gun chamber is rapidly evacuated. Meanwhile the pre-evacuated target chamber 13 is assembled on the opposite end of the flight range from the gun chamber and the vacuum valves 18 and 19 opened to provide an aligned clear path along the various parts for projectile flight completely through the system to the target. Pumping of the system is continued until the pressure has dropped to approximately one micron of mercury at which time the gun is ready for firing.

To fire the hypervelocity gun the voltage from the variable power supply 26 is increased so that nearly maximum current flows into the capacitor bank 27 to build up a substantial charge in the capacitors. The voltage and the charge in the capacitors is increased until it reaches a value where the Mylar film 54 between the lithium wire and the front electrode 51 cannot resist the electrical potential and breakdown occurs, completing the circuit from the capacitors to ground and allowing a heavy current to be conducted through the lithium wire. The Mylar film employed in the operation of the apparatus preferably has a dielectric strength of approximately 25,000 volts before electrical breakdown occurs, at which time the capacitor bank contains approximately 22,000 joules of energy. Upon electrical breakdown of the dielectric film a maximum current of 300,000 amperes or more flows through the completed circuit for a very short time. The instantaneous current density in the lithium wire exceeds 5,000,000 amperes per square centimeter. This large current flow rapidly increases the temperature of the lithium wire to form an electrically conductive gas which is in excess of 100,000° Kelvin and which is possibly as high as 350,000° Kelvin.

The lithium vapor formed by the exploding wire is in a contained volume defined by the pyrophyllite cylinder 42 and the rear electrode 46. This vapor escapes from its confinement along the axis of the gun chamber through the passageway 52 in the front electrode. The Mylar film 59 supporting the projectiles to be accelerated is vaporized by the extremely high temperature lithium vapor and offers infinitesimal resistance to the free expansion of the vapor down the axial passage 57 in the gun barrel. The high density lithium vapor which is expanding from a transient pressure in the pyrophyllite cylinder estimated to be in the order of a half million atmospheres to the vacuum that is in the flight range, is traveling through the gun barrel at a high velocity that is usually in excess of 50,000 feet per second. This high velocity gas, which has a very high density, accelerates the projectiles 62 by aerodynamic drag, entraining them in the flowing lithium vapor and quickly bringing them to a velocity approaching that of the lithium vapor.

The volume of the passage 52 in the front electrode between the two Mylar films 54 and 59 isolates the projectiles to be accelerated from the extremely disturbed electrical conditions at the arc interface between the expanding lithium vapor and the shoulder 53 of the front electrode. By providing about ½ inch of space between the two Mylar films, it is possible to prevent damage to the projectiles from the electric arc and subject the projectiles only to the high temperature, high velocity lithium vapor. However, it is desirable to keep the distance between the two films relatively short and preferably not over ½ inch so that the expanding lithium vapor is not traveling at its maximum velocity at the time it reaches the projectiles that are to be accelerated. This minimizes the impact loading on the projectiles and the instantaneous acceleration that they must undergo and minimizes fracturing of brittle projectiles. The lithium vapor provides aerodynamic drag on the projectiles throughout the length of the gun barrel.

At the downstream end of the gun barrel 55 the cross section of the tubular connection 31 is substantially larger than the passage through the gun barrel and the lithium vapor expands radially and its density rapidly decreases so that very little acceleration is imparted to the projectiles after their traverse through the gun barrel. The gun barrel is preferably about 1¼ to 12 inches long to provide a maximum amount of exposure to the accelerating forces, with a longer barrel yielding a higher velocity for given conditions of acceleration. Excessive barrel lengths, however, expose the projectiles to elevated temperature for so long a time that the temperature of the projectiles may be raised above the melting point of the material or sufficient heat is absorbed in the surfaces of the projectiles to cause spallation from thermal gradients.

The space between the two Mylar films 54 and 59 as defined by the passage 52 in the front electrode has a diameter larger than the diameter of the passage through the gun barrel to provide a reflected shock wave from the rear surface of the gun barrel, which wave augments the velocity of the expanding lithium vapor. Alternatively this construction can be eliminated and the diameter of the passage 52 can be the same as the diameter of the passage through the gun barrel.

The velocity of the projectiles is measured by the time interval between the discharge of the capacitor and the passage of the projectile at a given distance. Some slight error is introduced by this measurement because of the small time interval at which the velocity of the projectile is less than the average velocity to travel the entire distance. However, in the experimental arrangement employed, the projectiles are undergoing acceleration for less than 10 microseconds and the total time of flight to the measuring point is in the order of 120 microseconds or more so that the error is slight.

The projectiles traveling through the flight range intercept a beam of light from a source of illumination 63 (FIG. 1) and reflect and scatter some of this light to a photomultiplier 64. The signal from the photomultiplier is displayed on a record oscillograph 66, the sweep of which is triggered by an inductive pickup 67 sensitive to the heavy flow of current occurring upon discharge of the capacitors. The time lapse between the discharge and the passage of the projectile at a known distance from the gun barrel is a measure of the velocity of the projectiles. The amplitude of the pulse as it passes the photomultiplier indicates whether the projectile has retained its original geometry and dimensions or whether a fractured fragment of a projectile has passed through the range. This amplitude is compared with a previously obtained amplitude characteristic of the projectiles under acceleration. No discrimination difficulty is encountered due to variations in velocity of the prejectiles since the photomultiplier responds to the photon flux rate and not to the total energy upon it. Other measuring instruments may be installed on the flight range in lieu of or in addition to the velocity measuring instrument such as, for example, flash X-ray equiment, cameras, or interferometers for studying shock waves.

In order to achieve high gas flow velocities in an exploding system the temperature in the gas should be extremely high and the molecular weight low. Such conditions are normally not encountered in chemical explosive systems but can be met by injection of electrical energy in very short time periods into a mass of propellant that, upon expansion due to the increased temperature travels at very high velocity. Discharge can be made into a compressed gas which expands after bursting a rupture disk. However, in order to accelerate a projectile by aerodynamic drag forces compressed gases are not suitable because the densities of even the most highly compressed gases are still relatively low. Lithium is the preferred material since a large quantity of energy can be discharged into the metal in a short period of time to produce a gas with a very high density and a low molecular weight. Other metals such as, for example, sodium, beryllium, magnesium or aluminum can be used in place of the lithium, but experimental difficulties are encountered and higher molecular weights limit the velocity obtainable. Other conductive materials such as carbon, waxes with a conductive material therethrough or liquids that are conductive at elevated temperatures can be used, but a starter wire or other special experimental techniques make these more difficult and of little utility except in limited types of experiments.

The geometry of the lithium wire to a large extent determines the total resistance of the electrical circuit through which the energy of the capacitors is discharged. The circuit is so constructed that the series resistances from other portions and the inductances are very low. The quantity of lithium that is employed in a particular experiment is determined by the energy it is desired to impart to the accelerated particles, large energy transfers requiring larger amounts of lithium. With a given mass of lithium the total resistance in the electrical circuit is set by selecting the ratio of length to diameter of wire. This is selected to obtain a suitable resistance both in the initial solid state and in the ionized gas state of lithium vapor. The length of lithium wire preferably varies from about one to three inches and its diameter from about 0.040 to 0.125 inch with a length of 1 to 1½ inches with a diameter of 0.060 inch particularly preferred. These preferred dimensions give uniformly good results in the acceleration of silicate glasses in the form of spheres about 40 to 100 microns in diameter.

The geometry of the acceleration chamber of the illustrative embodiment is preferred because of the low inductance encountered. Current passes into the chamber through a side and to a metal conductor on the axis of the chamber. Current flow is along the axis of the system through the exploding cylinder and the front electrode and thence to ground. The rate of discharge of the capacitors and hence the rate of energy input into the exploding cylinder can be limited by excessive inductance in the circuit; therefore, it is desirable to keep the inductance low. The current flow in the aligned or coaxial arrangement of elements provides a suitably low inductance.

The coaxial arrangement is also preferred to provide straight line flow of the lithium vapor upon explosion rather than requiring a change in direction of flow with a consequent pressure drop. The straight line flow also decreases the erosion of the chamber walls and reduces the number of particles of chamber wall and gun parts that appear in the flight path in the early time period when the projectiles are passing. Any fragments that flow into the flight path with the coaxial arrangement trail the projectiles and the expanding vapor and are readily compensated for. The coaxial arrangement also permits the expansion to occur in a passage of metal rather than ceramic with consequent reduction in the number of particles entering the gas flow. By having the expansion pass through the electrode sustaining the arc, the interference of extraneous arcing along the expansion path is avoided and uniform accelerations are obtained. Additionally the aligned or coaxial arrangement of elements simplifies the construction of the accelerating system and provides good strength for retaining the high pressures generated.

It is also preferred that the resistance of the lithium be adjusted by its geometry so that the electrical circuit is at substantially 60 percent of critical damping. The use of damping in the range from 60 percent to 80 percent of critical damping of the capacitors gives the maximum energy dissipation in the lithium vapor in the time interval in which the particles are undergoing acceleration with a minimum of voltage overshoot which may damage the capacitors. For most accelerations the projectiles are in the passage through the gun barrel and undergoing acceleration for less than 10 microseconds. It is desirable to have approximately 5–6 microseconds for a quarter cycle discharge of the capacitors to obtain optimum energy transfer to the projectiles.

Projectiles that are accelerated by this technique are preferably spheres having a diameter that is less than $\frac{1}{20}$ of the diameter of the passage through the gun barrel to minimize contact with the sides of the passage and permit acceleration by aerodynamic drag rather than pushing against the base of the projectile. Projectiles from about 35 to 400 microns in diameter are readily accelerated by aerodynamic drag and preferably spherical projectiles about 40 to 45 microns in diameter are accelerated. The use of spheres aids in measurements on projectile ballistics and also reduces ambiguity in interpreting impact phenomena. Larger or smaller projectiles are also conveniently accelerated, however, it is desirable that the projectiles be less than $\frac{1}{10}$ of the diameter of the passage through the gun barrel to minimize side wall turbulences and other undesirable effects.

As mentioned previously the acceleration system can also be used for accelerating gases alone to high velocity, in which case no projectiles are suspended in the system and the gun barrel is preferably replaced by a convergent-divergent nozzle. Also the acceleration system can be used to accelerate a projectile by pressure of the gas against the base of the projectile, however, lower velocities are obtained and higher pressures occur in the gun chamber for a given energy input, thereby requiring strong gun chambers or lower energies. Just as the gun can be used to accelerate a projectile by base pressures, it can be used to accelerate projectiles mounted in an ablative or frangible sabot.

The velocity to which a projectile can be accelerated is to a large extent determined by the properties of the material. Limitations are imposed by the melting point of the material, the amount of vaporization that occurs from the surface of the projectiles in the high temperature lithium vapor and by the mechanical strength required to resist the high acceleration rates obtaining in the gun barrel. Both transparent and opaque materials can be accelerated, however the latter are more limited in velocity because of the absorption of higher amounts of energy. Metals being accelerated are generally limited to lower velocities because of the lower melting points. Spheres of aluminum oxide, soda lime glass, borosilicate glass, fused quartz, other silicate glasses, tungsten, nickel, stainless steel and aluminum have been successfully accelerated in the hypervelocity gun. Preferably spheres of silicate glasses are accelerated since these are strong enough to withstand accelerating forces, and are of low enough absorption and high enough melting temperature to withstand the high temperature lithium vapor for a sufficient time to allow acceleration to vary high velocities.

Because of the divergence of the line of flight of some projectiles from the axis of the system and the possibility of their encountering some of the projectiles and optical baffles (not shown) which may be along the flight range, a number of spheres are loaded simultaneously to assure a reasonable probability of at least one projectile but preferably not more than five passing through the entire length of the flight range and impacting upon the target. Because the projectile spheres are of approximately equal mass and in the case of multiple passage of projectiles there is a considerable range in velocities, little ambiguity is encountered in assigning each impact crater on the target to a specific projectile passing through the system.

Although only certain embodiments have been set forth, it is apparent that various changes and modifications may be made by one skilled in the art without departing from the scope of this novel concept. It is to be understood that the above is by way of illustration only and is not to be taken by way of limitation, the spirit and scope of this invention being limited only by the terms of the claims.

What is claimed is:

1. A method of accelerating a relatively small projectile to hypervelocity comprising:
   a vaporizing a closely confined elongated solid,
   expanding the vaporizing solid along a path axially aligned with the solid, and
   aerodynamically entraining within said expanding vapor a projectile to be accelerated.

2. An accelerating apparatus comprising:
   an evacuated chamber,
   an electrically conductive elongated body adjacent said evacuated chamber,
   passage means between the body and the chamber substantially aligned with the body,
   means for substantially preventing radial expansion of said elongated body,
   a dielectric film at on end of said body, and
   means for applying voltage across said film to cause breakdown thereof.

3. An accelerating apparatus comprising:
   an electrically conductive body,
   an electrode adjacent one end of the body,
   a dielectric film between the body and the electrode,
   means for applying voltage between the body and the electrode to cause electrical breakdown of the dieelectric film and for supplying sufficient current to vaporize the body,
   an evacuated chamber adjacent the body for receiving expanding vapor of the vaporized body, and
   means for supporting a projectile in said evacuated chamber.

4. The apparatus of claim 3 wherein the evacuated chamber is substantially aligned with the body and has a diameter considerably greater than the size of the projectile.

5. The apparatus of claim 4 wherein the projectile is supporting at distance from the dielictric film to achieve isolation from electrical effects of the breakdown and at a point in the path of the expanding vapor wherein the vapor travels at less than its maximum velocity.

6. A projectile accelerating apparatus comprising:
   an electrically conductive wire,
   an electric circuit including the wire,
   dielectric means in said circuit adjacent one end of the wire for initiating electrical conduction through the circuit at a predetermined voltage,
   means for directing current through the circuit sufficient to vaporize the wire,
   means for substantially preventing radial expansion of said wire; and
   means for directing expansion of vaporized wire along the axis of the wire 7. A projectile accelerating apparatus comprising:
   an electrically conductive wire,
   an electric circuit including the wire,
   dielectric means in said circuit adjacent one end of the wire for initiating electrical conduction through the circuit at a predetermined voltage,
   means for directing current through the circuit sufficient to vaporize the wire,
   means for directing expansion of vaporized wire in a predetermined direction, and
   vaporizable means for supporting projectiles in the path of expansion.

8. The apparatus of claim 7 wherein the electrically conductive wire is lithium.

9. A particle accelerating apparatus comprising:
   a flight range;
   electrically explosive means for projecting particles through said flght range at high velocity; and
   measuring means for sensing velocity and physical integrity of particles, said measuring means comprising: illuminating means for directing radiant energy to the flight range, for illuminating particles in flight;
   a photon flux rate detector for providing an output signal at the time of passage of particles through said flight range and having a signal amplitude responsive to the condition of particles in said flight range;
   trigger means responsive to the electrically explosive means for providiing a start signal; and
   output means connected to said trigger means and said detector for sensing the time interval between the start signal and the signal from said detector.

10. A method of accelerating projectiles comprising:
    generating a high electric potential across a dielectric film between a metal wire and an electrode,
    electrically breaking down the dielectric film to initiate current flow between the wire and the electrode,
    passing sufficient current through the wire to vaporize the wire,
    expanding the metal vapor in a direction of desired projectile acceleration, and
    aerodynamically dragging projectiles with the metal vapor to induce a high velocity therein.

11. The method of claim 10 further comprising the step of:
    suspending projectiles to be accelerated substantially in alignment with the axis of the metal wire, and
    wherein the expanding step comprises expanding lithium metal vapor in a direction along the axis of the wire and through a passage in the electrode.

12. A projectile accelerating apparatus comprising:
    a target chamber having a target holder,
    a flight range in fluid communication with the target chamber, means for evacuating the target chamber and the flight range,
    a member having an expansion passage opening onto the flght range remote from the target chamber and aligned therewith,
    a vaporizable film supporting projectiles intermediate the walls of the passage,
    a metal wire aligned with the passage near an end of the passage opposite the flght range,
    means for electrically exploding the wire, and
    means for preventing radial expansion of the wire.

13. An apparatus for accelerating projectiles by aerodynamic drag comprising:
    a lithium wire,
    a dielectric medium at one end of the wire, said medium having a predetermined dielectric strength,
    means for applying sufficient voltage across the dielectric medium to cause electrical breakdown thereof,
    means for directing a current through the wire sufficient to vaporize the wire,
    a pressure retaining means surrounding the wire for preventing radial expansion thereof,
    sealing means for preventing axial expansion of the wire in one direction,
    a gun barrel having a passage therethrough aligned with the wire for permitting axial expansion of the wire, and
    projectiles supported at an end of the passage in a position out of contact with walls of the passage, said projectiles being smaller than $\frac{1}{10}$ the diameter of the passage.

14. An apparatus for accelerating projectiles comprising:
- a high energy capacitor bank having first and second voltage portions,
- a power supply electrically connected to the capacitor bank,
- a target chamber having a target holder,
- a flight range aligned with the target chamber,
- means for measuring the velocity of accelerated projectiles,
- a gun chamber aligned with the flight range on the opposite end thereof from the target chamber, said gun chamber comprising:
  - a connecting tube in fluid communication with the flight range,
  - a gun barrel having an axial passage therethrough contained in the connecting tube,
  - a front electrode adjacent to and coaxial with the gun barrel and having an axial passage therethrough,
  - a thin vaporizable film between the gun barrel and the front electrode, said film supporting a projectile to be accelerated in a position intermediate the walls of the passage through the gun barrel,
  - an insulating cylinder adjacent the front electrode coaxial with the gun barrel and having an axial passage therethrough,
  - a lithium wire substantially filling the passage through the insulating cylinder,
  - a dielectric film between the lithium wire and the front electrode,
  - a flat rear electrode aligned with the gun barrel and in electrical contact with the lithium wire at the opposite end thereof from the front electrode,
  - a first electrically continuous path between the rear electrode and the first voltage portion of the capacitor bank,
  - a second electrically continuous path between the front electrode and the second voltage portion of the capacitor bank,
  - a resilient hollow cylinder surrounding the insulating cylinder, and
  - a pressure retaining cylinder surrounding the resilient cylinder.

References Cited by the Examiner

UNITED STATES PATENTS

| | | | |
|---|---|---|---|
| 2,926,566 | 3/1960 | Atkins et al. | 89—7 X |
| 2,988,994 | 6/1961 | Fleischer et al. | 102—24 |
| 2,995,035 | 8/1961 | Bloxsom et al. | 73—147 |
| 3,154,014 | 10/1964 | Dunne | 89—8 X |
| 3,167,014 | 1/1965 | Kopito | 102—70.2 X |
| 3,181,464 | 5/1965 | Parker et al. | 102—46 X |
| 3,182,496 | 5/1965 | Holderer | 73—147 |

OTHER REFERENCES

"Exploded Wire Studied for Use in Space Thrust," Research/Development, October 1960, pages 39 and 40.

"Hypervelocity Research," by F. J. Zimmerman, Research/Development, May 1962, pp. 34–36.

RICHARD C. QUEISSER, *Primary Examiner*.

C. A. RUEHL, *Assistant Examiner*.